Nov. 23, 1965         G. E. FRANCK         3,219,366
REINFORCED FLUID CONTROL FITTING
Filed Feb. 20, 1962                    2 Sheets-Sheet 1
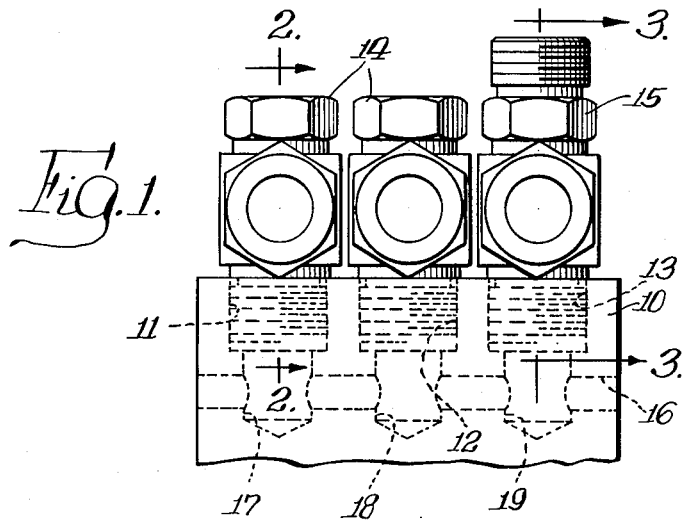
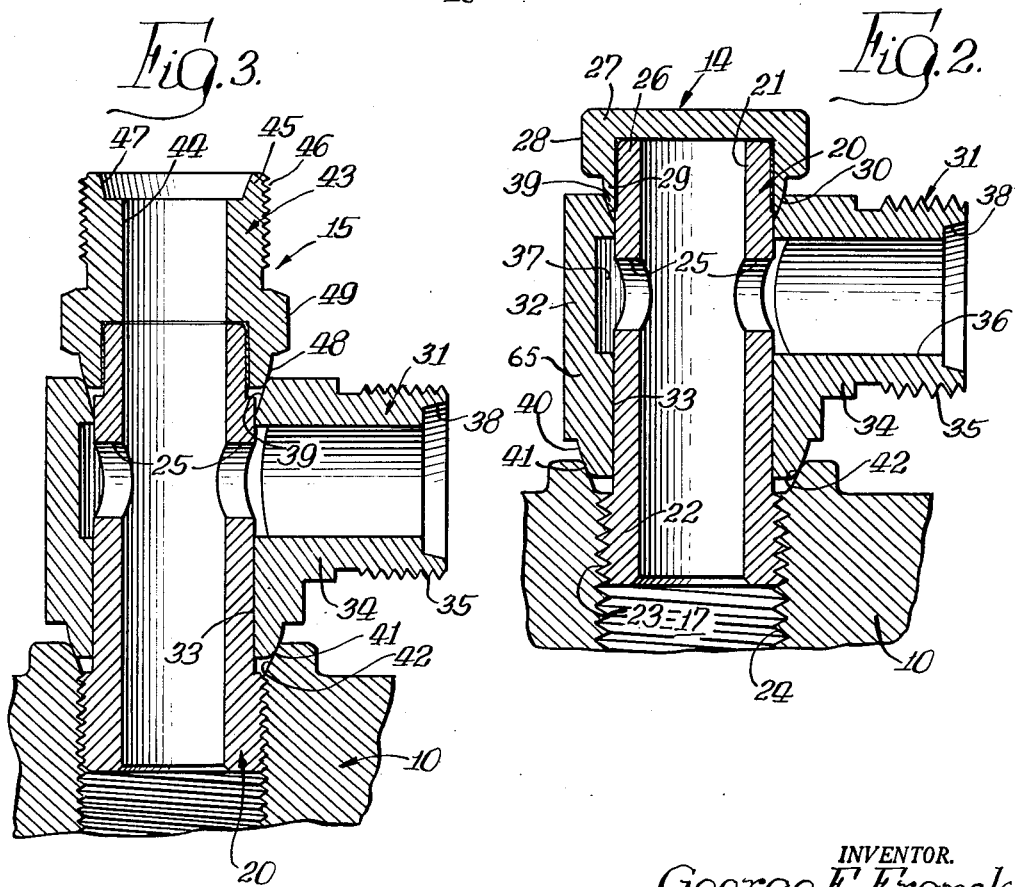
INVENTOR.
George E. Franck Nov. 23, 1965
G. E. FRANCK
3,219,366
REINFORCED FLUID CONTROL FITTING
Filed Feb. 20, 1962
2 Sheets-Sheet 2
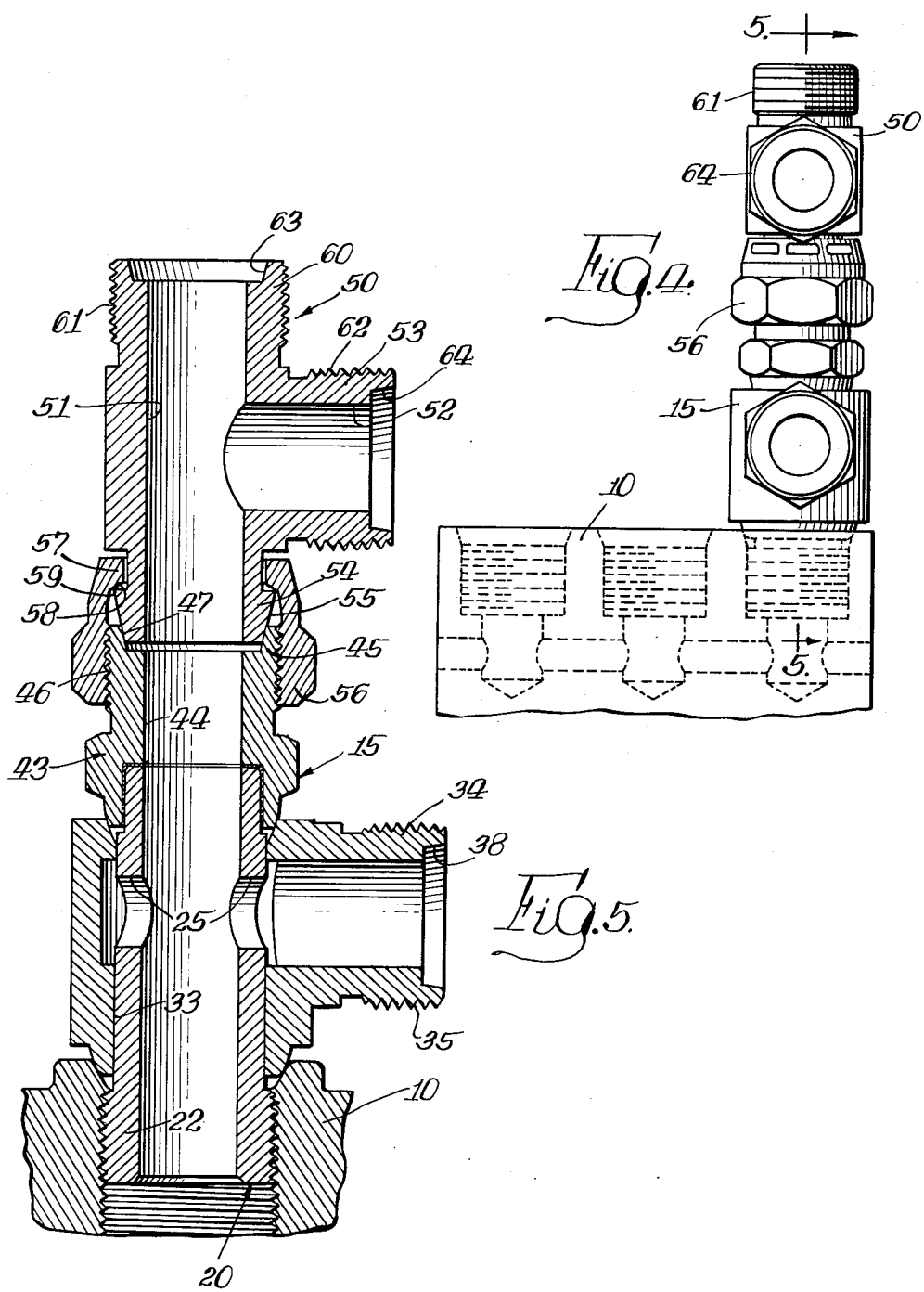

United States Patent Office 3,219,366
Patented Nov. 23, 1965

3,219,366
REINFORCED FLUID CONTROL FITTING
George E. Franck, Morton Grove, Ill., assignor to Imperial-Eastman Corporation, a corporation of Illinois
Filed Feb. 20, 1962, Ser. No. 174,624
2 Claims. (Cl. 285—190)

This invention relates to fittings and in particular to close-connection fittings.

The recent development of complicated hydraulic and pneumatic control equipment has necessitated the development of fittings such as couplings and the like which are of effectively minimum size and which may be installed closely together. In certain instances, such fittings are installed on manifolds or sub-plates in immediate side-by-side relationship. While such an arrangement provides the desirable feature of minimization of space requirements, the known fittings employed in such close-connection apparatus do not permit facilitated installation and removal of the individual fittings. Thus, while providing a desirable compact arrangement, substantial maintenance difficulties have resulted.

The present invention comprehends a new and improved close-connection fitting which permits desirable close installation of a plurality thereof while yet providing for facilitated installation and removal of any of the plurality when desired.

Thus, a principal object of the present invention is to provide a new and improved fitting arranged for close association of a plurality thereof.

Another object of the invention is to provide such a fitting permitting facilitated installation and removal of any one of the plurality.

Still another object is to provide such a close-connnection fitting wherein the manipulation of the fitting for installation and removal may be effected at the distal ends thereof whereby ready free access is provided to each of the plurality of fittings.

Still another object of the invention is to provide such a close-connection fitting adapted for use with a conventional port means and arranged for use over a wide range of temperatures and pressures.

Still another object of the invention is to provide such a close-connection fitting having improved sealing means and arranged for effectively precluding undesirable deformation of the sealing means as during installation of the fitting.

Yet another object of the invention is to provide such a close-connection fitting arranged for coaxial stacking.

Other features and advantages of the invention will be apparent from the following description taken in connection with the accompanying drawings wherein:

FIG. 1 is a front elevation of a plurality of close-connection fittings embodying the invention, installed on a sub-plate provided with a corresponding plurality of conventional ports;

FIG. 2 is an enlarged diametric section of one fitting taken substantially along the line 2—2 of FIG. 1;

FIG. 3 is an enlarged diametric section of another of the fittings taken substantially along the line 3—3 of FIG. 1;

FIG. 4 is a front elevation of a fitting assembly including a fitting as shown in FIG. 3 installed on a sub-plate and a modified form of fitting embodying the invention superposed thereon; and FIG. 5 is an enlarged diametric section thereof taken substantially along the line 5—5 of FIG. 4.

In the exemplary embodiment of the invention as disclosed in FIG. 1 of the drawing, the sub-plate 10 is provided with a plurality of conventional S.A.E. standard straight threaded ports 11, 12 and 13. A pair of elbow fittings 14 and a T-fitting 15, embodying the invention, are installed on the sub-plate in close side-by-side relationship, being threaded respectively into the ports 11, 12 and 13. In the illustrated embodiment, sub-plate 10 is provided with a through bore 16 intersected by a plurality of connecting bores 17, 18 and 19 providing communication respectively between ports 11, 12 and 13 and through bore 16.

Referring now more specifically to FIG. 2, the structure of fitting 14 may be seen in greater detail. As shown, fitting 14 includes a tubular bolt 20 having an axial through bore 21. The inner end 22 of the bolt is radially enlarged and is threaded at 23 for engagement with the threaded portion 24 of the port 17. The bolt is further provided with a pair of diametrically opposed openings 25 spaced longitudinally inwardly of the outer end 26 thereof.

At the outer end 26, the bolt is closed by a cap 27 provided with a hexagonal periphery defining a plurality of tool-engaging flats 28. The cap includes a depending annular flange 29 having a downwardly narrowing angular seating surface 30. In the illustrated embodiment, surface 30 is arcuate in cross section. Cap 27 is fixedly secured to the end 26 of bolt 20, as by induction brazing, whereby the bore 21 is sealingly closed at the outer end 26.

Fitting 14 further includes an elbow body 31 swivelly mounted on the bolt 20. More specifically, elbow body 30 includes a swivel portion 32 provided with a through bore 33 in which bolt 20 is slidably fitted. In the assembly of the fitting 14, the bolt is extended through the bore 33 prior to the brazing of the cap 27 on end 26 thereof. Extending radially outwardly from swivel portion 32 is a tubular connecting portion 34 having a threaded outer end 35 and an axial bore 36 intersecting the bore 33 and including a diametrically opposed inner end portion 37. The bore 36 and its end portion 37 are aligned with the openings 25 so that free communication is had between bore 36 and bore 21 of the bolt 20 at all times. The distal end of bore 36 defines a radially enlarged frusto-conical seating surface 38 for use in sealingly coupling a conventional conduit (not shown) to the elbow body 31 by a suitable coupling fitting (not shown).

Coupling portion 32 of the elbow body 31 is further provided with a frusto-conical seating surface 39 arranged to be sealingly engaged by the sealing surface 30 of the cap 27 as shown in FIG. 2. In the illustrated embodiment, the sealing surface 39 tapers downwardly at an included angle of approximately 30°. At its lower end, the swivel portion 32 is provided with a depending annular boss 40 having a downwardly narrowing sealing surface 41 which, in the illustrated embodiment, is arcuate in cross section. Sealing surface 41, as shown in FIG. 2, sealingly engages the frusto-conical surface 42 of the port 17. As shown in FIGURE 2, the mid-portion 65 of the coupling portion 32 of the elbow 31 defines a rigid annular portion slidably receiving the bolt 20 and maintaining a coaxial relationship between the coupling portion 32 and the bolt at all times including during the sealing engagement of the cap surface 30 with the elbow surface 39 and the elbow surface 41 with the port surface 42.

Referring more specifically now to FIG. 3, fitting 15 is shown to comprise a fitting generally similar to fitting 14 except that the cap 27 of the fitting 14 is substituted by a connector 43 having a through bore 44 opening through an outer end 45 of the connector. The connector is exteriorly threaded at 46 at outer end 45 and the bore 44 terminates at its outer end in a radially enlarged recess defining a frusto-conical sealing surface 47. Thus, the distal end of the connector 43 is generally similar to the distal end of the connector portion 34 of the elbow body 31 and is adapted for ready connection of a tube (not shown) thereto by a suitable conventional coupling (not shown).

The lower end of the connector 43 is defined by sealing surface 48 generally similar to sealing surface 30 of cap 27. Directly above the sealing surface 48, the connector 43 is provided with a hexagonal periphery defining a plurality of two engaging flats 49 similar to two engaging flats 28 of cap 27. In all other respects, the fitting 15 is generally similar to the fitting 14.

The fittings 14 and 15 are sealingly connected to the sub-plate 10 by threading the bolt 20 thereof into the port as seen in FIG. 1. As the tool-engaging surfaces are accessible from the top of the fitting, the fittings may be disposed in close side-by-side relationship as shown in FIG. 1. Illustratively, such fittings arranged for use with one-half inch tubing may be arranged on the sub-plate 10 with the vertical center lines of the ports 17, 18 and 19 spaced approximately 1″ apart. Conventional fittings for use with such threaded ports have heretofore required approximately 1¾″ center line spacing.

The threading of the bolt into the port is effected by suitable manipulation of a wrench or the like engaging the flats 28 of cap 27 or 49 of connector 43. As the bolt is threaded downwardly, the sealing surface of cap 30 or sealing surface 48 of connector 43 engages the sealing surface 39 of the elbow body 31. The downward force is transmitted through the elbow body thereby urging the sealing surface 41 thereof against the sealing surface 42 of the threaded port. The resultant seal of the bolt to the sub-plate 10 and to the elbow body 31 is a positive, rigid seal capable of resisting high-frequency vibrations, a wide range of static pressures, a wide range of temperatures, and extremely high pressure surge forces. As the seals are effectively wedge-type seals, a positive seal is effected at all times notwithstanding the application of radial forces to the fitting as may inadvertently occur during the torqueing of the bolt during the threading installation thereof on the sub-plate. Still further, the wedge-type seals permit some back-off of the cap 27 or connector 43, as the resiliency of the fitting elements will effectively maintain the desired seal.

Referring now to FIGS. 4 and 5, a modified arrangement embodying the invention is shown to include a fitting 15 mounted on sub-plate 10 and carrying at the upper end thereof a modified form of fitting 50 embodying the invention. Fitting 50 is arranged to be sealingly secured to the upper end 45 of the fitting 15 so that a stacked arrangement of the fittings may be effected as shown in FIG. 4.

More specifically, fitting 50 comprises a T-fitting having a through bore 51 and a branch bore 52 opening into bore 51 and outwardly through a lateral boss 53. The lower end 54 of the fitting 50 defines a frusto-conical seating surface 55 concentric with bore 51 and adapted for sealing engagement with sealing surface 47 of the upper end 45 of fitting 15. Forceful sealing engagement of surface 55 with surface 47 is effected by means of a suitable nut 56 threadedly engaging the threaded portion 46 of the end 45 of fitting 15 and having an inturned flange 57 at its upper end provided with a downwardly facing frusto-conical surface 58 engaging an annular shoulder 59 at the upper end of the frusto-conical surface 55 of the fitting end 54, thereby urging the fitting end 54 axially toward the lower fitting end 45 as an incident of the threaded advance of the nut 56 on the threaded portion 46 of the lower fitting 15.

The upper end 60 of fitting 50 is exteriorly threaded at 61 and the outer end of the lateral boss 53 is exteriorly threaded at 62 for co-operation with securing means such as nut 56 in sealingly securing associated elements (not shown) to frusto-conical surface 63 of fitting end 60 and frusto-conical surface 64 of lateral portion 53 in the same manner as fitting end 54 is sealingly secured to fitting end 45.

Thus, fitting 50 effectively comprises an extension of fitting 15 providing an additional connection in parallel with the connection afforded by the lateral extension 34 of the fitting 15. In addition, further fittings 50 may be stacked on fitting 50 as desired, or the upper end 60 of the fitting 50 may be closed by a suitable threaded cap (not shown) to close the upper end of the assembly. In all other respects, fitting 50 is similar to fitting 14 and functions in a similar manner.

As the seals in fittings 14, 15 and 50 are effected directly between the metallic members of which the fittings are comprised, substantially improved resistance to high temperature and corrosive fluids are provided in comparison to those fittings wherein sealing gaskets are employed to effect the desired seal. Thus, while the fittings are extremely simple and economical of construction, they provide long trouble-free life and facility of maintenance.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A close-connection fitting comprising: means defining a threaded port having a frusto-conical outer end comprising a frusto-conical surface having an included angle of less than 90°; a tubular bolt having an exteriorly threaded inner end threaded into said threaded port, an exteriorly cylindrical mid-portion, an outer end, a bore opening inwardly through said inner end, and a port opening transversely through said mid-portion and communicating with said bore; means sealingly closing said outer end; means on said outer end providing tool engaging surfaces for rotation of said bolt about the longitudinal axis thereof for threading said inner end into said threaded port means; a tubular connector having a connecting portion and a distal end, a bore extending through said connecting portion, said mid portion of the bolt extending slidably coaxially through said connector bore, a flow passage connecting with said connector bore and opening through said distal end, said flow passage being aligned with said port; convex rounded inwardly facing sealing means carried by said outer end of said bolt and complementary, frusto-conical outwardly facing sealing means on said connector for sealing the bolt to the connector as a result of longitudinal inward movement of the bolt through said connector bore; and convex rounded, inwardly facing sealing means on one end of said connecting portion of said connector for sealingly engaging the frusto-conical port end as a concomitant result of the longitudinal inward movement of the bolt through said connector bore upon threading of said bolt inner end into the threaded port means, said connecting portion having a rigid annular mid-portion between said flow passage and said one end thereof for closely embracing and slidably supporting the connector coaxially on the bolt during sealing engagement of the sealing surface of said one end with said port means, whereby forcible threading of the bolt inner end into said threaded port causes said one end of the connecting portion of the connector to be urged radially inwardly by the engagement thereof with said frusto-conical outer end of the port and moves said sealing means carried by said outer end of the bolt inwardly to maintain a sealing engagement thereof with said outwardly facing sealing means on the connector.

2. The close-connection fitting of claim 1 wherein said means on the outer end of said bolt comprises a member fixedly carried by the bolt.

References Cited by the Examiner

UNITED STATES PATENTS

| | | | |
|---|---|---|---|
| 543,008 | 7/1895 | Gale | 285—190 X |
| 1,728,961 | 9/1929 | Eisermann | 285—190 X |
| 2,537,612 | 1/1951 | Wildermuth | 285—332 X |
| 2,942,895 | 6/1960 | Lyon | 285—212 |
| 3,003,795 | 10/1961 | Lyon | 285—212 |
| 3,116,401 | 12/1963 | Drugmand | 285—189 |
| 3,145,035 | 8/1964 | Hanback | 285—212 X |

FOREIGN PATENTS

| | | |
|---|---|---|
| 22,506 | 1/1962 | East Germany. |
| 861,036 | 12/1952 | Germany. |
| 651,499 | 4/1951 | Great Britain. |
| 843,338 | 8/1960 | Great Britain. |

CARL W. TOMLIN, *Primary Examiner.*